US005541585A

United States Patent [19]

Duhame et al.

[11] Patent Number: 5,541,585

[45] Date of Patent: Jul. 30, 1996

[54] SECURITY SYSTEM FOR CONTROLLING BUILDING ACCESS

[75] Inventors: Dean C. Duhame, Roseville; Daniel V. Meyvis, Bloomfield Hills, both of Mich.

[73] Assignee: Stanley Home Automation, Novi, Mich.

[21] Appl. No.: 321,256

[22] Filed: Oct. 11, 1994

[51] Int. Cl.$^6$ .............................. G08B 13/18; G06F 7/04; E05B 47/02

[52] U.S. Cl. .................................... 340/825.690; 340/572; 340/825.310; 235/382; 49/31

[58] Field of Search .......................... 340/825.31, 825.36, 340/825.37, 825.54, 825.69, 500, 541, 542, 901, 572; 49/31; 235/382

[56] References Cited

U.S. PATENT DOCUMENTS

| | | | |
|---|---|---|---|
| 3,701,100 | 10/1972 | Yarbrough | 340/825.31 |
| 3,866,173 | 2/1975 | Moorman et al. | 235/382 |
| 3,891,980 | 6/1975 | Lewis et al. | 340/258 |
| 4,023,139 | 5/1977 | Samburg | 340/506 |
| 4,141,010 | 2/1979 | Umpleby et al. | 343/225 |
| 4,196,347 | 4/1980 | Hadley | 340/825.31 |
| 4,580,136 | 4/1986 | Kitamura et al. | 340/825.31 |
| 4,697,383 | 10/1987 | Hagiwara | 49/31 |
| 4,712,103 | 12/1987 | Gotanda | 235/382 |
| 4,763,121 | 8/1988 | Tomoda et al. | 340/825 |
| 5,319,362 | 6/1994 | Hyatt, Jr. | 340/825.31 |
| 5,339,073 | 8/1994 | Dodd et al. | 340/825.31 |

FOREIGN PATENT DOCUMENTS

| | | | |
|---|---|---|---|
| 9311511 | 6/1993 | WIPO | 340/825.31 |

*Primary Examiner*—Michael Horabik
*Assistant Examiner*—William H. Wilson, Jr.
*Attorney, Agent, or Firm*—Young & Basile

[57] ABSTRACT

The present invention provides a security system for controlling access of persons through a controlled portal. The portal, such as a door, has a lock mechanism for securing the door. A presence detector senses the presence of an object within an approach zone located substantially adjacent the portal. When an object is detected, a fixed transceiver automatically transmits an interrogation signal into the approach zone. A portable transceiver is carried by the person seeking access to the portal. The portable transceiver responds to the interrogation signal by transmitting a response signal. Each portable transceiver or group of transceivers has a unique identification code which is included in the response signal. The fixed transceiver receives the response signal and determines whether the response signal contains a valid access code. If a valid access code is received, the portal is unlocked and other devices may be activated.

19 Claims, 4 Drawing Sheets

SECURITY SYSTEM FOR CONTROLLING BUILDING ACCESS

BACKGROUND OF THE INVENTION

The present invention relates to a building security system which controls access to a building through a controlled portal, such as a locked door.

Mechanical door locking mechanisms which require a conventional key to unlock the door have been well known for many years. These mechanisms require a person to manually insert the key into the lock and turn the key to displace a bolt which, until displaced, prevents the door from being opened. This operation requires that the person locate the key, select the proper key for the particular lock, and unlock the door. The unlocking process requires one or both hands, requiring the person to set aside some or all of the items they may have been carrying. After the door is unlocked, the person must then turn the door knob to open the door. After opening the door, then any items previously set aside must be retrieved. All of these activities take time to perform, causing the person seeking access to remain outside the door for an extended period of time. The additional time spent outside the door is especially disfavorable in high-crime areas or in adverse weather conditions such as rain, snow or extreme temperatures.

Remote control or "keyless" entry systems are also well known in the art. Some systems, instead of using a conventional metal key, use hand-held electronic devices which transmit a signal to a receiver in the door which decodes the signal and, if found to be from an authorized source, unlocks the door. The hand-held transmitters may be carried in a purse or pocket like a traditional key. However, to unlock the door, hand-held transmitters still require the person seeking access to set aside some or all of the items they are carrying, locate the transmitter in, for example, their purse or pocket, and press the appropriate button on the transmitter. These hand-held transmitters therefore suffer many of the same problems as conventional keys. Unlocking doors by turning door knobs in a pre-prescribed manner also suffer many of these same problems.

SUMMARY OF THE INVENTION

The present invention is a security system which automatically unlocks a door as an "authorized person" enters an approach zone proximate a controlled portal such as a building entry door. The invention does not require the person seeking access to locate a key or insert the key into a lock, or turn the knob in a pre-prescribed manner. Further, there are no buttons or switches to be manually activated and, therefore, it is not necessary for the person to set aside any items being carried. By automatically unlocking the door, the present invention allows the person to quickly enter the building, minimizing the time spent outside the door opening.

In accordance with the invention, a presence detector, such as a passive infrared detector, is mounted on or near the portal. This presence detector senses a person or an object in the approach zone. The presence detector activates a fixed transmitter or transceiver to send an interrogation signal into the approach zone. A transceiver carried anywhere on a person in the approach zone receives the interrogation signal and transmits back its own unique code to a fixed receiver. The signal code is analyzed and, if found acceptable, a suitable electro mechanical locking mechanism is activated to unlock or even open the portal.

In actual implementation, means may be provided to adjust the sensitivity of the presence detector so that only people or large objects are detected, thus eliminating "false" detections such as small animals and blowing leaves. Furthermore, the presence detector may be adjusted to detect objects within a specified distance and angular relationship of the portal. This predetermined detection distance prevents "false" detections by people walking near the portal but not actually approaching the portal for access.

The fixed transmitter is preferably mounted to or inside a door frame and is connected to the presence detector. The portable transceiver is preferably small enough to be carried in a purse or pocket. The portable transceiver has a receiver which can receive the interrogation signal from the fixed transmitter. The portable transceiver has a transmitter which automatically transmits a signal in response to the interrogation signal. Each portable transceiver's response signal contains a unique identification code. Thus, no two portable transceivers will transmit the same identification code in the response signal. Alternatively, a group of portable transceivers may transmit the same identification code in the response signal. Thus, each portable transceiver in the group would transmit the same identification code, but that code would be different from any portable transceiver not in the group.

In the preferred form of the invention, a photo cell is mounted to the door frame which senses the level of light present at the door opening. When the ambient light is below a predetermined level, the photo cell activates a dim light mounted to the door frame. The dim light provides a low level of light to the door area. Further, a courtesy light is mounted to the door frame and connected to the fixed transceiver. When a person or object is detected near the door opening and the ambient light is below a predetermined level, the courtesy light is activated. The courtesy light provides greater illumination of the door opening than the dim light.

In accordance with still further aspects of a preferred form of the invention, an intercom is mounted to the door frame. The intercom communicates to the fixed transceiver and also connected to an intercom control unit located within the building. The intercom system allows communication between a person inside the building and a person at the door opening. The intercom control unit includes one or more door unlock switches which release the door lock mechanism. Each switch allows a person inside the building to lock or unlock a door for someone outside the building who does not have the appropriate key or portable transceiver. The intercom may also be used to automatically broadcast a prerecorded statement or warning using the speaker in the intercom.

A programmable timer is preferably connected to the fixed transceiver. The programmable timer controls access to the building depending on the time of day and the identification code received from the portable transceiver. Thus, certain portable transceiver identification codes may unlock the door at certain times of the day but leave the door locked at other times of the day. Since each portable transceiver has a unique identification code, the access times for each portable transceiver can be controlled independently of the others. Alternatively, a group of portable transceivers with the same identification code can be controlled independently of other portable transceivers.

In the preferred embodiment, an access reactivation switch is mounted to the door frame. This switch, when pressed by someone outside the door, restarts the building access process. This switch may be used when a person carrying a valid portable transceiver approaches the door but the door does not unlock automatically. Pressing the access reactivation switch restarts the building access process as if the individual had just been detected by the presence detector.

According to another aspect to the preferred form of the invention, the fixed transceiver is connected to other electronic devices and remote monitoring facilities using a communication link. The communication link allows the fixed transceiver to control other devices such as indoor lights, low voltage outdoor lights, garage doors, windows, a thermostat, or appliances within the building. For example, when a valid response code is received by the fixed transceiver, the inside lights may be turned on, the thermostat may be adjusted to a predetermined temperature level, and certain appliances may be turned on, such as a television, radio, or coffee maker. Since each portable transceiver has a unique identification code, different electronic devices may be activated depending on which portable transceiver is used to unlock the door.

Preferably, the remote monitoring system is connected to the fixed transceiver using the communication link. The remote monitor may be located within the building or in another building such as a security office which monitors door openings.

In the preferred form of the invention, a camera is mounted at the door opening and connected to the communication link to allow a remote monitoring location to view the person or persons seeking access to the building. The camera is only activated when an object or person is detected by the presence detector. A video recorder is used to record the activities at the door opening during the day.

In operation, the presence detector is activated when a person or object comes within a predetermined distance of the building in the area of the controlled portal or door. This detection activates the fixed transceiver which transmits an interrogation signal. If a portable transceiver is present, it receives the interrogation signal. The portable transceiver then responds to the interrogation signal by transmitting a response signal. The fixed transceiver receives the response signal and determines whether the response signal contains a valid access code for the particular time period. If the code is valid, the door is unlocked, and other programmed devices are activated.

DETAILED DESCRIPTION OF THE PREFERRED EMBODIMENT

Figure 1:
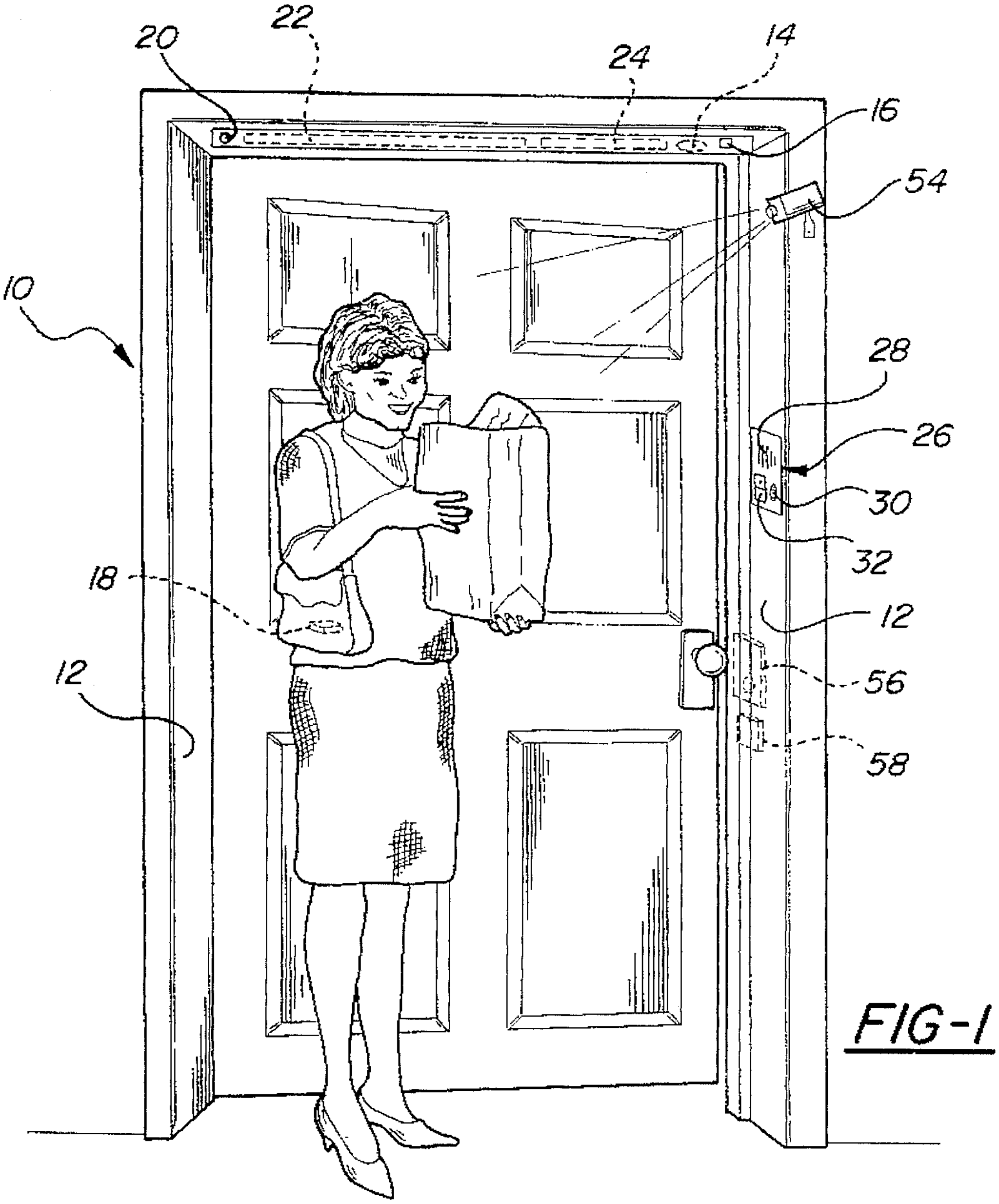
FIG. 1 shows the present invention installed in a conventional door opening.

Referring to FIG. 1, a conventional door opening 10 is shown; however, it will be understood that the present invention may be used in conjunction with other types of controlled portals, such as safe and vault doors, garage doors, patio doors, security doors, air locks, hatches and gates.

Figure 2:
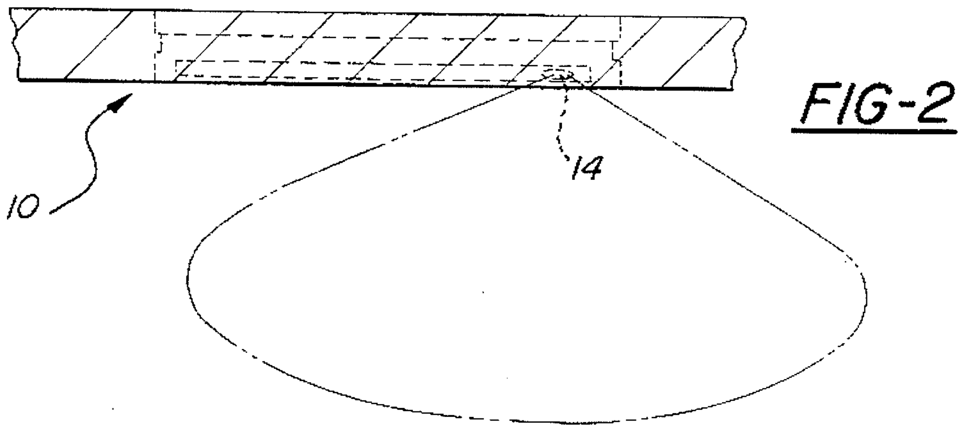
FIG. 2 is a top view of the door opening showing the approach zone indicated by the dashed lines.

Door opening 10 is surrounded by a door frame 12. A presence detector 14 is mounted to the top of door frame 12. Presence detector 14 is a passive infrared detector with adjustable sensitivity and distance settings and is aimed into an approach zone proximate the door. The approach zone is illustrated in FIG. 2 using dashed lines. The sensitivity of presence detector 14 may be adjusted such that only persons and large objects are detected. When properly adjusted, objects such as small animals and blowing leaves will not activate the presence detector. Presence detector 14 may also be adjusted to detect persons and objects within a particular distance and angular relationship of door opening 10, thereby defining the approach zone (shown in FIG. 2). When properly adjusted, persons walking near door opening 10, but not actually in the approach zone, will not activate presence detector 14. These adjustment settings minimize the number of "false" detections by presence detector 14.

A fixed transceiver 16 is located in door frame 12. Fixed transceiver 16 is electrically connected to presence detector 14. When presence detector 14 is activated, a signal is automatically transmitted to fixed transceiver 16, thereby activating the fixed transceiver. When activated, fixed transceiver 16 transmits an interrogation signal into the approach zone. The interrogation signal is transmitted as a radio frequency signal. Various types of modulation techniques may be used to transmit the interrogation signal. In the preferred embodiment, a series of width modulated pulses are used, as disclosed in U.S. Pat. No. 4,141,040, to Umpleby, et al. Fixed transceiver 16 is unidirectional and positioned such that the interrogation signal is only transmitted to the exterior side of door opening 10. This prevents the interrogation signal from being received by portable transceivers located inside the building which might inadvertently unlock the door. Fixed transceiver 16 also contains a receiver capable of receiving a radio frequency signal.

A portable transceiver 18 is small enough to be carried in a purse or pocket. Portable transceiver 18 has a receiver capable of receiving the interrogation signal transmitted by fixed transceiver 16. Portable transceiver 18 also has a transmitter capable of automatically transmitting a radio frequency signal in response to the interrogation signal. In the preferred embodiment, a series of width modulated pulses are used, as disclosed in U.S. Pat. No. 4,141,040. In one embodiment of the invention, the portable transceiver's response signal includes a unique identification code. Thus, each portable transceiver 18 transmits a response signal different from any other portable transceiver. This allows the identity of each portable transceiver 18 to be determined. In another embodiment of the invention, a group of portable transceivers 18 have the same identification code. The identification code of the group of transceivers is different from any portable transceiver not in the group. Based on the unique identification code, the identity of the person or group to whom the portable transceiver is assigned may also be determined. When portable transceiver 18 receives the interrogation signal from fixed transceiver 16, it automatically transmits the response signal, requiring no user intervention. Thus, it is not necessary to remove portable transceiver 18 from the purse or pocket and no buttons or switches are required to be actuated on the transceiver.

Those skilled in the art will understand that various systems can be used to store, decode and verify the identification code transmitted by portable transceiver 18. One such system is disclosed in U.S. Pat. No. 4,141,010. Preferably, fixed transceiver 16 has a "teach" or "learn" function allowing the fixed transceiver to "learn" the code stored in portable transceiver 18. Using this "teaching" process, fixed transceiver 16 can be programmed to accept the code of several different portable transceivers 18.

An electromechanical door lock mechanism 56 is contained in door frame 12. Lock mechanism 56 is electrically connected to fixed transceiver 16. If fixed transceiver 16 receives a valid response code, lock mechanism 56 will be activated to unlock the door. Additionally, lock mechanism 56 may automatically release the door latch when unlocking the door. This allows the user to push the door open with minimal force and does not require manipulation of the door knob.

A photo cell 20 is mounted to door frame 12, and senses the light level at door opening 10. Photo cell 20 is electrically connected to fixed transceiver 16 and a dim light 22. Dim light 22 is mounted to door frame 12 and provides a low level of light to the door opening. Photo cell 20 may be adjusted to activate at a predetermined light level. When photo cell 20 is activated, dim light 22 is turned on. Dim light 22 allows individuals approaching door opening 10 to easily locate the door opening during darkened time periods. A courtesy light 24 is also mounted to door frame 12 and electrically connected to fixed transceiver 16. Courtesy light 24 will be turned on when both photo cell 20 and presence detector 14 have been activated. Courtesy light 24 provides a higher level of light to door opening 10 when an object is detected near the door opening.

A door open sensor 58 is located on door frame 12. Door open sensor 58 is electrically connected to fixed transceiver 16 and senses whether the door is open or closed.

Figure 3:
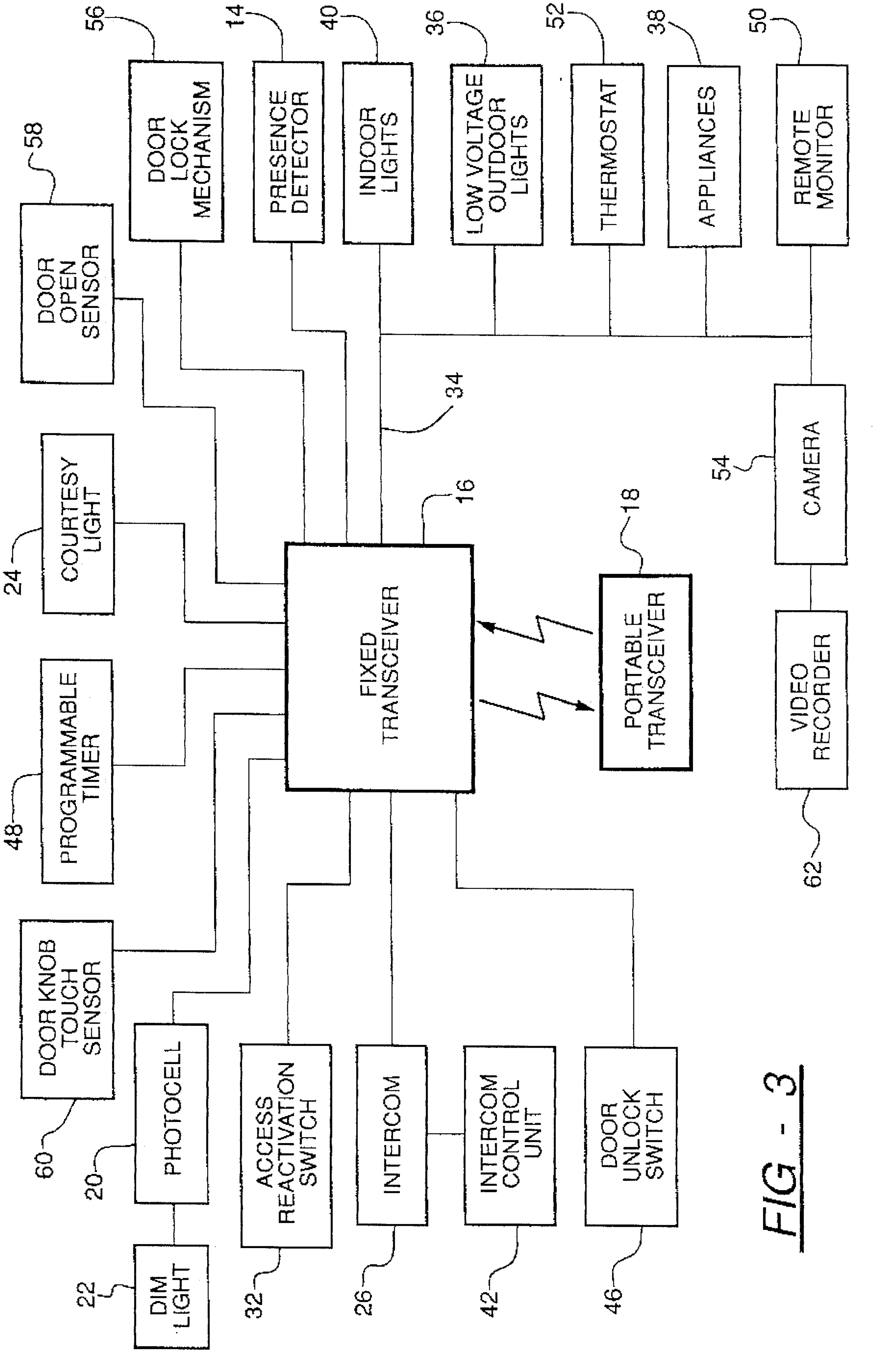
FIG. 3 shows the interconnection of the various components of the invention.
Figure 4:
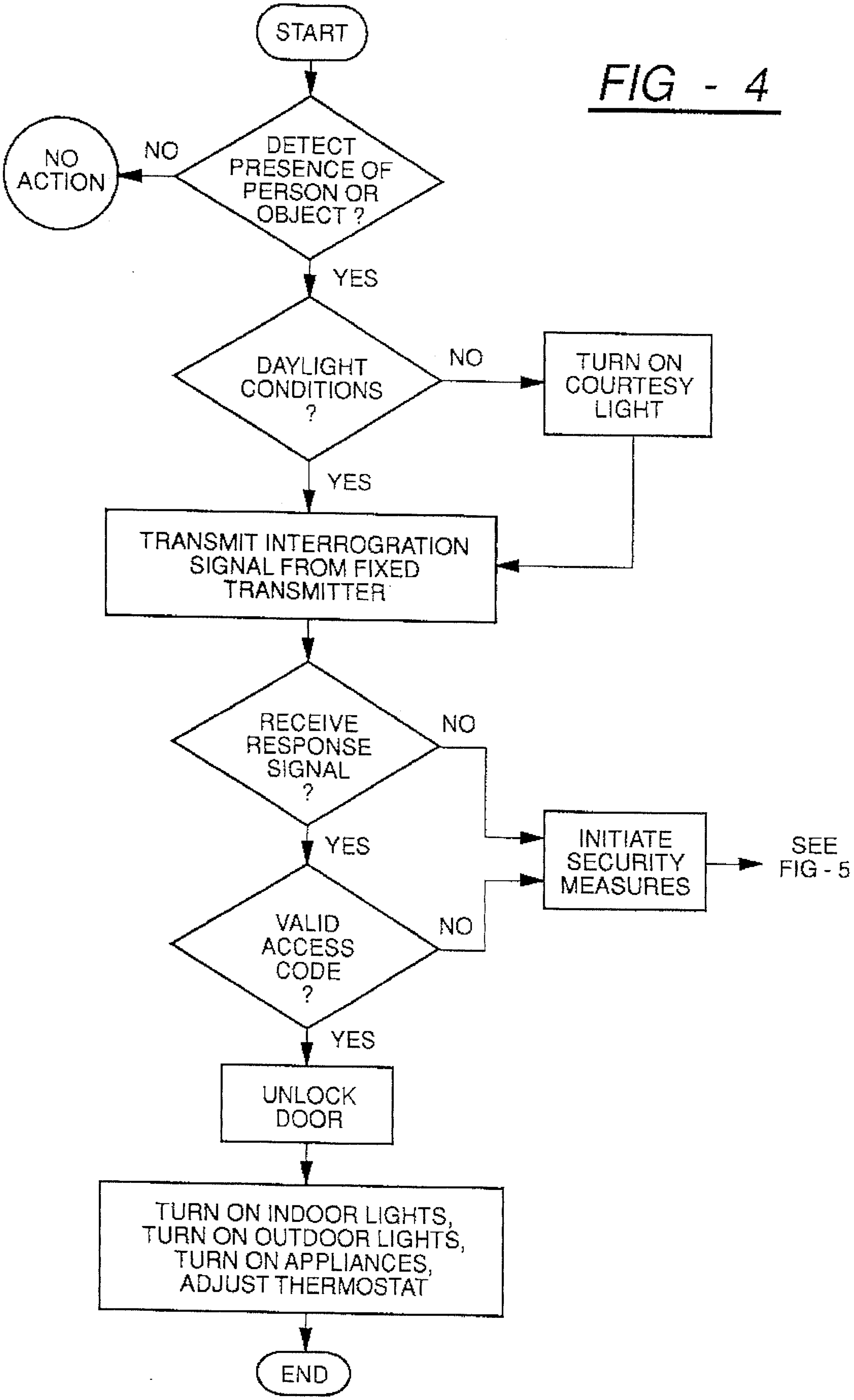
FIG. 4 is a flowchart showing the basic operation of the invention.
Figure 5:
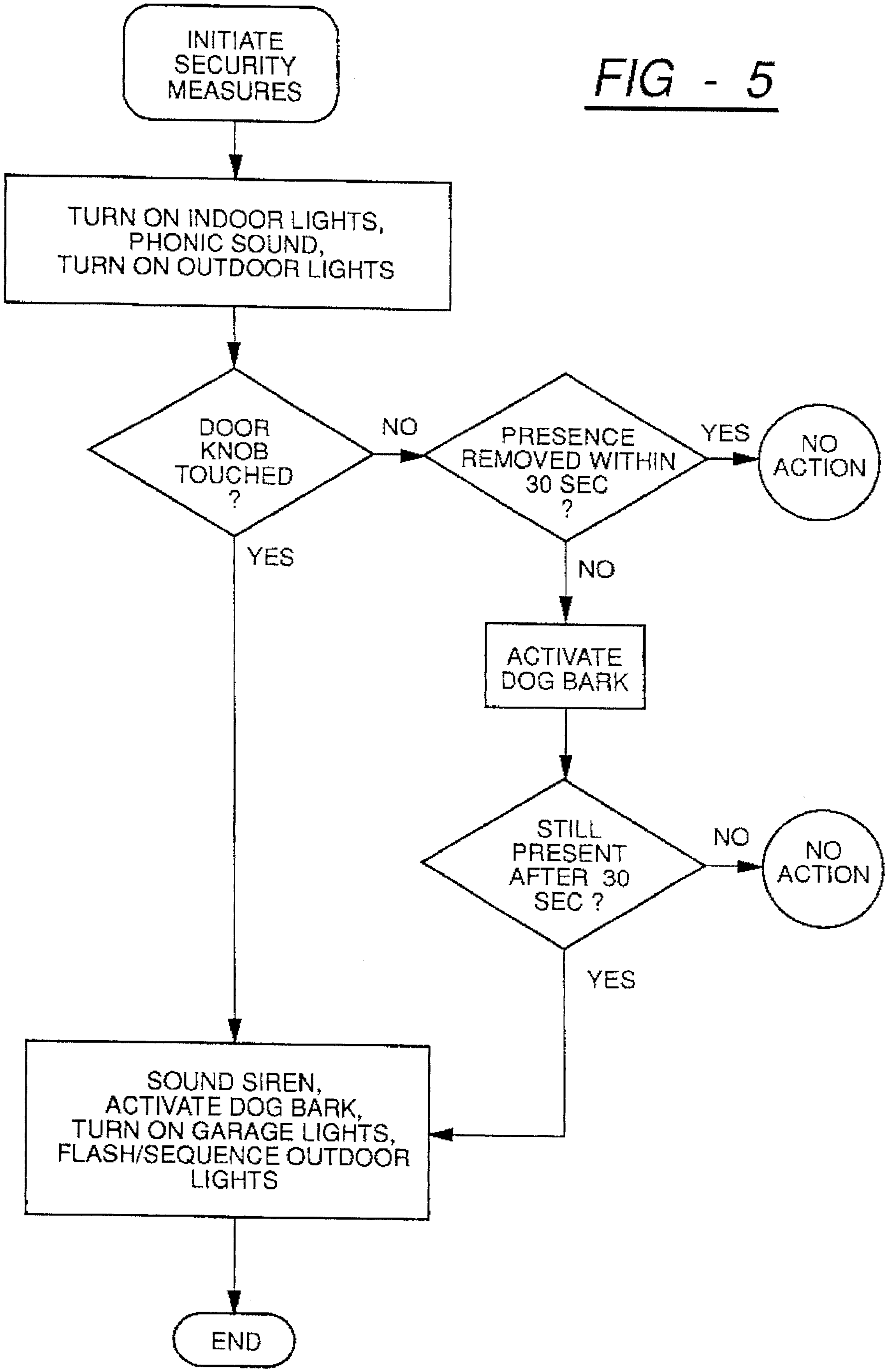
FIG. 5 is a flowchart showing the procedure for initiating security measures.

A door knob touch sensor 60 (shown in FIG. 3) is connected to fixed transceiver 16. Touch sensor 60 is activated by vibration, such as a person touching the door knob.

An intercom 26 is mounted to door frame 12. Intercom 26 contains a speaker 28 and a microphone 30. Intercom 26 is electrically connected to fixed transceiver 16 and intercom control unit 42 (shown in FIG. 3). Intercom control unit 42 is located inside the building and also contains a speaker and a microphone. Intercom 26 and intercom control unit 42 allow persons inside the building to communicate with persons at door opening 10. Intercom speaker 28 may also be used to broadcast a prerecorded message upon activation of the presence detector 14. The broadcast message may welcome the person to the building, notify the person that the residents are not home, or may warn the person that a security system is actively protecting the building.

A door unlock switch 46 is located within the building, and electrically connected to door lock mechanism 56. Door unlock switch 46 may be depressed by a person inside the building to unlock mechanism 56. A separate door unlock switch 46 may be provided for every door to the building. Door unlock switch 46 provides an override system for the automatic door unlocking process. Preferably, door unlock switch 46 is mounted near intercom control unit 42. Thus, after a person inside the building has verified the identity of the person seeking access, the door can be unlocked with the door unlock switch 46.

An access reactivate switch 32 is mounted to door frame 12. Switch 32 restarts the door unlocking procedure. When switch 32 is depressed, the fixed transceiver transmits an interrogation signal as if presence detector 14 had just been activated. Switch 32 is useful when the automatic unlocking process did not function properly.

A programmable timer 48 is electrically connected to fixed transceiver 16. Programmable timer 48 allows certain portable transceivers 18 to automatically unlock the door during specific programmed time periods. Thus, building access can be controlled for each individual portable transceiver 18 or group of transceivers based on time of day, day of week, etc.

Programmable timer 48 may be programmed with "critical security periods" and "non-critical security periods." Critical security periods are times when attempted building access is unlikely and, therefore, any person detected is more likely to be a security threat. For example, a door to a home may have a "critical security period" between 11:00 pm and 6:00 am, a time period when people are not expected to seek access to the building. Programmable timer 48 can respond differently depending on whether the access attempt is made during a "critical security period" or a "non-critical security period."

It will be understood by those skilled in the art that various types of programmable timers 48 may be used with the present invention. Preferably, programmable timer 48 is a separate unit which is programmable in a manner similar to an electronic alarm clock. Alternatively, programmable timer 48 may be part of a larger home automation system or a personal computer system.

A communication means 34 is connected to fixed transceiver 16. In the preferred embodiment, communication means 34 consists of a radio frequency communication link. Alternate embodiments may use an infrared communication link, a line carrier, or a hard wired communication link. Communication means 34 connects fixed transceiver 16 to various devices in and around the building.

Communication means 34 can connect a variety of devices which are activated when a person is detected in the approach zone or when the door is unlocked. These devices include low voltage outdoor lights 36, appliances 38, indoor lights 40, and a thermostat 52. Programmable timer 48 may be programmed to activate various devices depending on the time of day and the identification code provided by the portable transceiver 18. For example, a first portable transceiver 18 may unlock the door, turn on the kitchen lights, set the thermostat to 68°, and turn on the television. A second portable transceiver 18 may turn on the living room lights, turn on the low voltage outdoor lights, set the thermostat to 72°, and turn on the radio. These programmable features may be changed periodically to conform to the user's preferences.

Although specific devices (outdoor lights, appliances, indoor lights and thermostats) have been disclosed, it will be understood that communication means 34 can be connected to activate any device in or around the building.

A camera 54 is mounted to door frame 12. Camera 54 is positioned to view the exterior side of door opening 10. Camera 54 is connected to communication means 34 and allows remote monitoring of door opening 10. Remote monitoring may occur within the building such as in a kitchen or bedroom, or may occur at a remote site such as a security monitoring center. Camera 54 is activated when an object or person is detected in the approach zone by presence detector 14. A video recorder 62 is connected to camera 54. The video recording device is activated whenever camera 54 is activated. Thus, the person or object in the approach zone is recorded by video recorder 62. This video recorder device provides a record of all persons who entered or attempted to enter the building through the particular door.

In the preferred embodiment, video recorder 62 is connected to camera 54 as shown in FIG. 2. In an alternate embodiment, video recorder 62 is located at a remote monitoring site and connected to camera 54 using communication means 34.

In operation, as a person enters the approach zone, presence detector 14 will be activated. When presence detector 14 is activated, a signal is automatically sent to fixed transceiver 16, causing the fixed transceiver to transmit an interrogation signal into the approach zone. The interrogation signal is received by portable transceiver 18 carried by the person. Portable transceiver 18 automatically responds to the interrogation signal by transmitting a response signal back to fixed transceiver 16. Fixed transceiver 16 then determines whether the response signal is valid. Fixed transceiver 16 compares the identification code received in the response signal with the information stored in programmable timer 48. If the signal is valid, door lock mechanism 56 is activated to unlock the door. In addition to unlocking the door, other devices may be activated such as interior lights, exterior lights, appliances, garage doors, windows, thermostats, etc. The devices which are activated can be programmed specifically for each portable transceiver 18 or group of portable transceivers 18.

When presence detector 14 is activated, camera 54 is automatically activated. Also, video recorder 62 is activated to record the person or persons seeking access to the building. By activating video recorder 62 only when an object is detected in the approach zone, the video recorder does not operate unnecessarily when there is no person seeking access.

If door open sensor 58 senses that the door is open, a signal is sent to thermostat 52 which adjusts the thermostat to prevent the heating system or air conditioning system from operating while the door is open. When door open sensor 58 senses that the door is closed, thermostat 52 is reset to its usual setting. A safety limit may be programmed which causes the heating system to operate when the door is open if the temperature drops below the safety limit. This prevents the temperature in the building from becoming dangerously low and causing damage such as bursting pipes.

If a valid response signal is not received from portable transceiver 18 within a specified time, the system will initiate security measures. Security measures may include turning on indoor lights, turning on outdoor lights, or broadcasting a warning or simulated dog bark. If the presence is removed within a specified time, such as 30 seconds, the security measures will be discontinued. However, if the presence remains after a specified time or if door knob touch sensor 60 is activated, then a second level of security measures may be activated. These include activating a siren, turning on garage lights and flashing the outdoor lights in a warning sequence.

If a presence is detected in the approach zone during a time period which has been programmed as a "critical security period," a different sequence of security measures can be initiated. These security measures may include turning on indoor and outdoor lights without waiting for a response to the interrogation signal. If a valid response signal is received by fixed transceiver 16, the security measures will be discontinued.

If the level of light at door opening 10 drops below a predetermined value, photocell 20 is activated. When photocell 20 is activated, dim light 22 is turned on, regardless of whether any presence has been detected. Dim light 22 assists people trying to find door opening 10 during darkened periods. Courtesy light 24 is turned on when both photocell 20 and presence detector 14 are activated. Courtesy light 24 provides additional lighting at door opening 10 for people seeking access to the building.

Although the present invention provides automatic access to the building, a conventional key may still be used to unlock the door. This allows a person to enter the building if they are not carrying a portable transceiver or if the automatic entry system is not working properly.

We claim:

1. A security system for controlling access of a person through a controlled portal having a lock mechanism, comprising:

a presence detector located near the portal which senses the presence of an object within an approach zone substantially adjacent the portal;

a fixed transceiver located at the portal and electrically coupled to the presence detector, said transceiver being activated by said presence detector after an object has been detected in said zone by said detector, the fixed transceiver being adapted to generate and transmit an interrogation signal into said zone said interrogation signal further being receivable by a remote portable transceiver, the fixed transceiver further including a receiver capable of receiving a response signal from said remote portable transceiver in response to said transmitted interrogation signal, wherein the fixed transceiver automatically transmits the interrogation signal into the approach zone after an object is detected in said zone by the presence detector;

said portable transceiver further being adapted to be carried by a person, and having a receiver capable of receiving the interrogation signal transmitted by said fixed transceiver and a transmitter capable of transmitting the response signal in response thereto, wherein the portable transceiver automatically transmits the response signal after receiving the interrogation signal;

means for determining whether the response signal contains a valid access code; and means for unlocking the lock mechanism in response to receipt of a valid access code.

2. The apparatus of claim 1 further including a photocell located proximate the portal, and a dim light located at the portal, the dim light being electrically coupled to the photocell to provide illumination during darkened periods.

3. The apparatus of claim 2 further including a courtesy light located at the portal and electrically coupled to the fixed transceiver to provide illumination when a person is present in the approach zone during darkened periods.

4. The apparatus of claim 1 further including an intercom located at the portal and on the approach zone side, the intercom being electrically coupled to the fixed transceiver, and an intercom control unit located on the opposite side of the portal and electronically coupled to the intercom.

5. The apparatus of claim 1 further including a programmable timer electrically coupled to the fixed transceiver for controlling portal access times.

6. The apparatus of claim 1 further including an access reactivation switch mounted at the portal for restarting the portal access process, the access reactivation switch being electrically coupled to the fixed transceiver.

7. The apparatus of claim 1 further including a means for communicating between the fixed transceiver and devices remote from and in communication with said fixed transceiver.

8. The apparatus of claim 7 wherein the means for communicating comprises a radio frequency communication link.

9. The apparatus of claim 1 further including means for remotely monitoring the portal.

10. The apparatus of claim 1 wherein the response signal contains a unique identification code.

11. The apparatus of claim 1 further including means for unlatching the portal.

12. The apparatus of claim 1 wherein the fixed transceiver receives and transmits signals unidirectionally from a location outside said portal into said approach zone so that said interrogation signal is exclusively received by a remote portable transceiver located outside said portal.

13. The apparatus of claim 1 further including means for video recording of the portal, the means for video recording being automatically activated after an object is detected in the approach zone.

14. The apparatus of claim 1, wherein said controlled portal is an opening of a building having a door adapted to pivot through the opening, a door frame mounted about the periphery of the opening, and a door lock mechanism between said door and said door frame to prevent said door frame from pivoting through said opening.

15. A method for controlling access of a person through a controlled portal having a lock mechanism, comprising the steps of:

detecting the presence of an object within an approach zone substantially adjacent the portal;

automatically transmitting an interrogation signal onto the approach zone;

automatically receiving a response signal transmitted from a portable transceiver carried by a person in the approach zone in response to said interrogation signal;

determining whether the response signal contains a valid access code; and unlocking the lock mechanism if a valid access code is received.

16. The method of claim 15 further including the step of programming a timer for controlling building access.

17. The method of claim 15 further including the step of monitoring the building opening from a remote location.

18. The method of claim 15 further including the step of unlatching the building opening.

19. The method of claim 15 further including the step of recording the building opening upon detection of an object in the approach zone.

* * * * *